(12) United States Patent
Paris, Sr. et al.

(10) Patent No.: US 7,530,329 B1
(45) Date of Patent: May 12, 2009

(54) DETACHABLE ASSEMBLY FOR HOLDING FOODSTUFF THEREIN

(76) Inventors: Paul J. Paris, Sr., Road #2, Box 274A, Colliers, WV (US) 26035; Shari Paris, Road #2, Box 274A, Colliers, WV (US) 26035

( * ) Notice: Subject to any disclaimer, the term of this patent is extended or adjusted under 35 U.S.C. 154(b) by 355 days.

(21) Appl. No.: 11/437,332

(22) Filed: May 19, 2006

(51) Int. Cl.
    A47F 5/08 (2006.01)
    A01K 5/01 (2006.01)
    A47B 96/00 (2006.01)

(52) U.S. Cl. ............ 119/61.57; 211/94.01; 248/222.52

(58) Field of Classification Search ............ 119/61.54, 119/61.57, 61.5, 454, 456, 449; 211/94.01, 211/70.6, 87.01; 292/13, 180; 248/221.11, 248/222.51, 222.52, 223.31, 225.11, 225.21
See application file for complete search history.

(56) References Cited

U.S. PATENT DOCUMENTS

| | | | |
|---|---|---|---|
| 2,845,896 A | | 9/1958 | Copeland |
| 3,175,263 A | * | 3/1965 | Bernstein ............... 248/49 |
| 3,554,165 A | * | 1/1971 | Carter .................. 119/477 |
| 3,717,258 A | * | 2/1973 | McKinnon ............ 211/87.01 |
| 4,011,951 A | * | 3/1977 | Boyer ................. 211/85.21 |
| 4,161,924 A | | 7/1979 | Welker |
| D275,247 S | * | 8/1984 | Sherman ................. D6/553 |
| 4,917,553 A | * | 4/1990 | Muller .................... 411/85 |
| 5,271,586 A | * | 12/1993 | Schmidt .................. 248/58 |
| 5,375,802 A | * | 12/1994 | Branham, II ........... 248/221.11 |
| 5,377,621 A | * | 1/1995 | Camm ................. 119/61.54 |
| 5,551,371 A | * | 9/1996 | Markey et al. .......... 119/499 |
| 5,551,971 A | | 9/1996 | Markey et al. |
| 5,692,817 A | * | 12/1997 | Jun et al. ................ 312/408 |
| 5,797,350 A | | 8/1998 | Smith |
| 5,893,538 A | * | 4/1999 | Onishi et al. ............. 248/65 |
| 5,964,190 A | | 10/1999 | Willinger et al. |
| 6,131,866 A | * | 10/2000 | Kesinger .............. 248/225.11 |
| 6,189,489 B1 | * | 2/2001 | Pearce ................. 119/477 |
| 6,314,911 B1 | * | 11/2001 | Kaytovich ............. 119/61.5 |
| 6,378,825 B1 | * | 4/2002 | Yee et al. ............. 248/221.11 |
| 6,481,585 B1 | * | 11/2002 | Cloughton ............ 211/89.01 |
| 6,508,449 B2 | * | 1/2003 | Veazey ............... 248/475.1 |
| 6,543,627 B1 | * | 4/2003 | Schiavo ................. 211/26 |
| 6,588,711 B2 | * | 7/2003 | Onishi ................... 248/49 |
| 6,854,611 B2 | * | 2/2005 | Powell ................. 211/192 |
| 7,353,775 B1 | * | 4/2008 | Stelmach ............ 119/61.54 |
| 2005/0045111 A1 | * | 3/2005 | Lin ..................... 119/61.5 |
| 2006/0180561 A1 | * | 8/2006 | Wisnoski et al. ....... 211/94.01 |

* cited by examiner

*Primary Examiner*—Michael Carone
*Assistant Examiner*—Brian M O'Hara

(57) ABSTRACT

An assembly includes a rectilinear rail that has a backside connected to a side wall of the pet house. The rail is registered along a horizontal plane and elevated from a ground surface and has a chamfered top wall provided with a linear groove extending along a length of the rail. The groove is laterally offset away from the back side and proximate to a near side of the rail. Coextensively shaped trays are slidably positional along the rail. The trays include monolithically formed fingers extending away from a center thereof that are intercalated within the groove. Each tray includes a spring-actuated mechanism for maintaining a predetermined tension between the fingers and an inner surface of the groove such that the trays are prohibited from displacing along the groove. The spring-actuated mechanism is permanently affixed to each of the trays.

15 Claims, 4 Drawing Sheets

DETACHABLE ASSEMBLY FOR HOLDING FOODSTUFF THEREIN

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to foodstuff holding assemblies and, more particularly, to a detachable assembly for holding foodstuff therein and being detachably connected to an outdoor pet house.

2. Prior Art

Pets, such as cats and dogs, bring enjoyment to many persons who find companionship and friendship from these animals. Children love playing with their pets, whereas the elderly, especially those who have lost a spouse, find comfort in their animal companion. As is well known, there is a lot of responsibility associated with owning a pet, among which feeding is probably the most important and basic responsibility required of the pet owner or caretaker.

Conventionally, pets like cats and dogs are fed from bowls that contain their wet or dry pellet type foods and their water. During the feeding process the animals, especially dogs, have a tendency to push the bowl along the floor as they are eating. This generally results in some food and water being spilled on the floor, or in worst case scenarios the whole bowl is accidentally tipped over, which obviously creates a mess. In the case of wet foods and water, stains can form on absorbent floor surfaces like carpets and tile grout.

In order to eliminate this problem, some prior art examples have been introduced wherein the food receptacles are incorporated into the structure of an animals housing, like a dog house or basket. Although these examples eliminate the possibility of the animal accidentally toppling the receptacle over and spilling the contents thereof, they still have many drawbacks. One disadvantage is the fact that the receptacles are not easily cleaned when permanently attached to the animals housing. A pet owner is required to get on their hands and knees in order to reach the bowls for periodic cleaning, which is necessary to ensure their pet remains healthy. Another disadvantage is that the inadvertent spilling of some foodstuff during the animal's vigorous eating process is not eliminated by these prior art examples, thus some staining of floor surfaces may still occur.

Accordingly, a need remains for a detachable assembly for holding foodstuff therein in order to overcome the above-noted shortcomings. The present invention satisfies such a need by providing a foodstuff holding assembly that is practical and durable in design, has hygienic value, and is convenient to use. The plastic design of the unit makes it light weight, inexpensive, corrosion resistant and easy to clean. Such an assembly holds an ample amount of food and water, and prevents spillage stains to floors and carpeting. This thus ensures that the food and water is not wasted, saving the user a considerable amount of time and money that would otherwise be spent on cleaning up and prematurely restocking the animal's food.

BRIEF SUMMARY OF THE INVENTION

In view of the foregoing background, it is therefore an object of the present invention to provide a detachable assembly for holding foodstuff therein. These and other objects, features, and advantages of the invention are provided by a foodstuff containing assembly detachably connected to an outdoor pet house.

The assembly includes an elongated and rectilinear rail that has a backside directly connected to a side wall of the pet house. Such a rail is registered along a horizontal plane and elevated from a ground surface. The rail preferably includes male and female sections telescopically engageable along a linear path. Such a rail further has a chamfered top wall provided with a linear groove extending along an entire longitudinal length of the rail. The groove is oriented parallel to a longitudinal axis of the rail wherein the groove is laterally offset away from the back side and proximate to a near side of the rail.

A plurality of coextensively shaped trays are slidably positional directly along the rail. Such trays may conveniently be independently and contemporaneously slidable along the longitudinal length of the rail. The trays include monolithically formed fingers laterally extending away from a center of the trays and directly intercalated within the groove respectively. One of the trays may be provided with a plurality of apertures formed in a bottom surface thereof for advantageously and effectively channeling fluid and debris away therefrom.

Each tray includes a spring-actuated mechanism for effectively maintaining a predetermined tension between the fingers and an inner surface of the groove such that the trays are advantageously prohibited from slidably displacing along the groove during eating conditions. Such a spring-actuated mechanism is permanently affixed directly to the trays respectively. The spring-actuated mechanism may be directly connected to a back side of the trays and be intercalated between the near side of the rail and the back side of the trays. Such a spring-actuated mechanism is manually adaptable along a fulcrum axis defined orthogonal to the longitudinal length of the rail between compressed and decompressed positions.

The spring-actuated mechanism preferably includes an annular base member that has a countersunk aperture centrally formed therein. Such a base member includes an elongated and rectilinear arm monolithically formed therewith and radially protruding away therefrom. The arm has a corrugated distal end portion for conveniently and effectively providing a gripping surface on which the user may grasp the arm. At least one washer is directly nested about the countersunk aperture. A beveled locking member is directly seated onto the base member wherein the washer is intercalated therebetween. Such a locking member has a sloping plane gradually offset from a top surface thereof wherein the sloping plane concentrically travels about the top surface. The locking member further has a centrally registered hole formed therein and vertically aligned with the aperture of the base member.

A cam lever has a pair of diametrically opposed flange portions protruding radially outward from an outer edge thereof and terminating at a predetermined distance offset from an outer perimeter of the locking member. A rigid seal is seated directly on top of the cam lever. A fastener is vertically inserted through the aperture and the hole wherein the fastener effectively maintains the locking member and the cam lever slidably engaged at the predetermined tension. The spring-actuated mechanism is adapted to the compressed position when a user toggles the arm and rotates the locking member about the fastener.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view showing a detachable assembly for holding foodstuff therein, in accordance with the present invention;

FIG. 2 is an enlarged perspective view of one of the trays shown in FIG. 1;

DETAILED DESCRIPTION OF THE INVENTION

Figure 3:
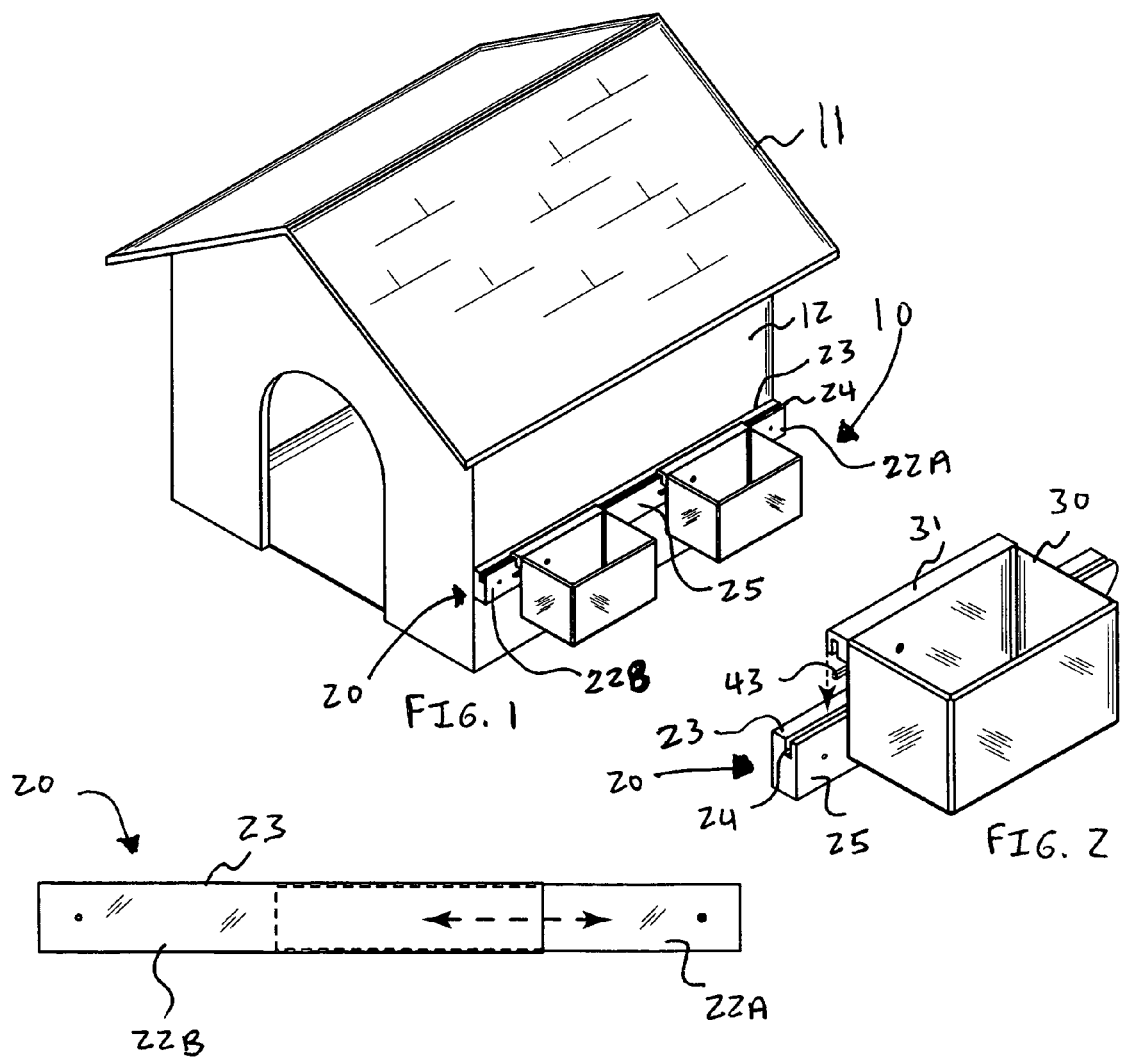
FIG. 3 is a front-elevational view of the rail shown in FIG. 1.
Figure 4:
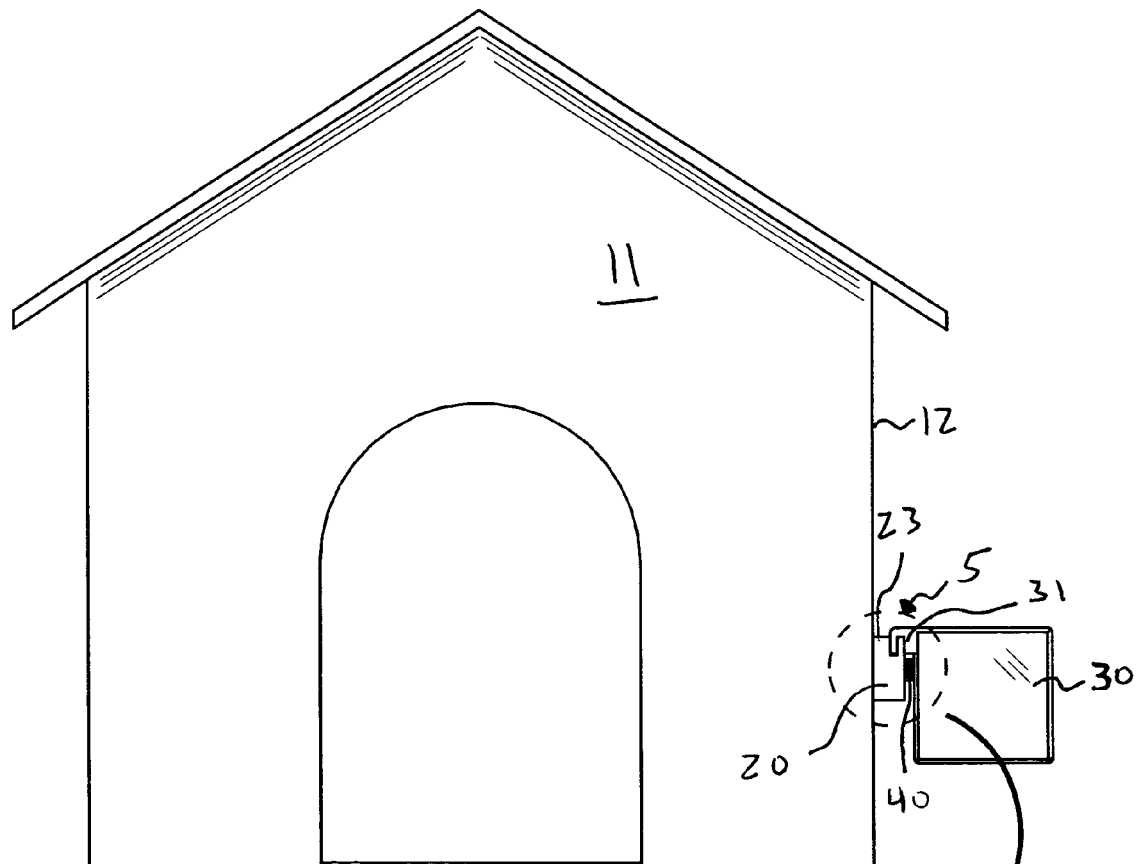
FIG. 4 is a front-elevational view of the assembly shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-7 by the reference numeral 10 and is intended to provide a detachable assembly for holding foodstuff therein. It should be understood that the assembly 10 may be attached to many different types of support surfaces and should not be limited in use to only being attached to dog houses.

Referring initially to FIGS. 1 through 5, the assembly 10 includes an elongated and rectilinear rail 20 that has a backside 21 directly connected, without the use of intervening elements, to a side wall 12 of the pet house 11. Of course, the rail backside 21 may be attached to any other suitable support surface, as is obvious to a person of ordinary skill in the art. Such a rail 20 is registered along a horizontal plane and elevated from a ground surface. The rail 20 preferably includes male 22A and female 22B sections telescopically engageable along a linear path. Such a rail 20 further has a chamfered top wall 23 provided with a linear groove 24 extending along an entire longitudinal length of the rail 20. The groove 24 is oriented parallel to a longitudinal axis of the rail 20 wherein the groove 24 is laterally offset away from the back side 21 and proximate to a near side 25 of the rail 20.

Referring to FIGS. 1, 2, 4, 5 and 6, a plurality of coextensively shaped trays 30 are slidably positional directly, without the use of intervening elements, along the rail 20. Of course, the trays 30 may be produced in a variety of alternate shapes, sizes and colors, as is obvious to a person of ordinary skill in the art. Such trays 30 are conveniently independently and contemporaneously slidable along the longitudinal length of the rail 20, thus allowing a pet owner to selectively adjust the trays 30 to an ideal position for their pet.

The trays 30 include monolithically formed fingers 31 laterally extending away from a center of the trays 30 and directly intercalated, without the use of intervening elements, within the groove 24 respectively. One of the trays 30A is provided with a plurality of apertures 32 formed in a bottom surface thereof that are essential for advantageously and effectively channeling fluid and debris away therefrom, especially in the event that the assembly is employed in an outdoors environment, as is best shown in FIG. 6.

Figure 5:
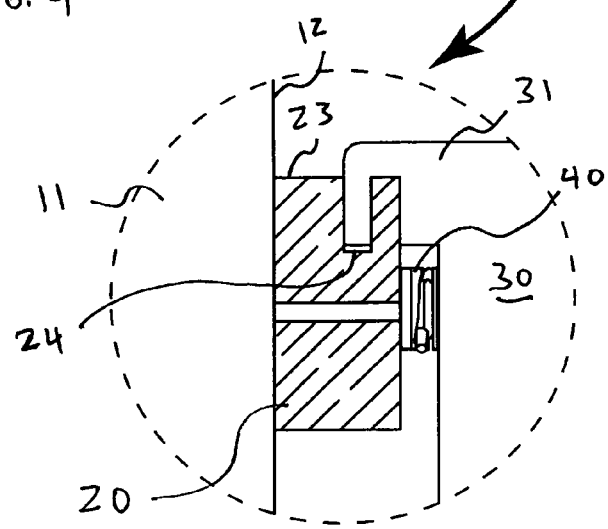
FIG. 5 is an enlarged front-elevational view of section 5 shown in FIG. 5.

Referring to FIGS. 2, 5, 6 and 7, each tray 30 includes a spring-actuated mechanism 40 that is vital for effectively maintaining a predetermined tension between the fingers 31 and an inner surface of the groove 24, which is crucial such that the trays 30 are advantageously prohibited from slidably displacing along the groove 24 during eating conditions. Such a spring-actuated mechanism 40 is permanently affixed directly, without the use of intervening elements, to the trays 30 respectively. The spring-actuated mechanism 40 is directly connected, without the use of intervening elements, to a back side 33 of the trays 30 and is intercalated between the near side 25 of the rail 20 and the back side 33 of the trays 30, as is best shown in FIG. 5. Of course, the spring-actuated mechanism 40 may be alternately positioned, as is obvious to a person of ordinary skill in the art. Such a spring-actuated mechanism 40 is manually adaptable along a fulcrum axis defined orthogonal to the longitudinal length of the rail 20 between compressed and decompressed positions.

Figure 6:
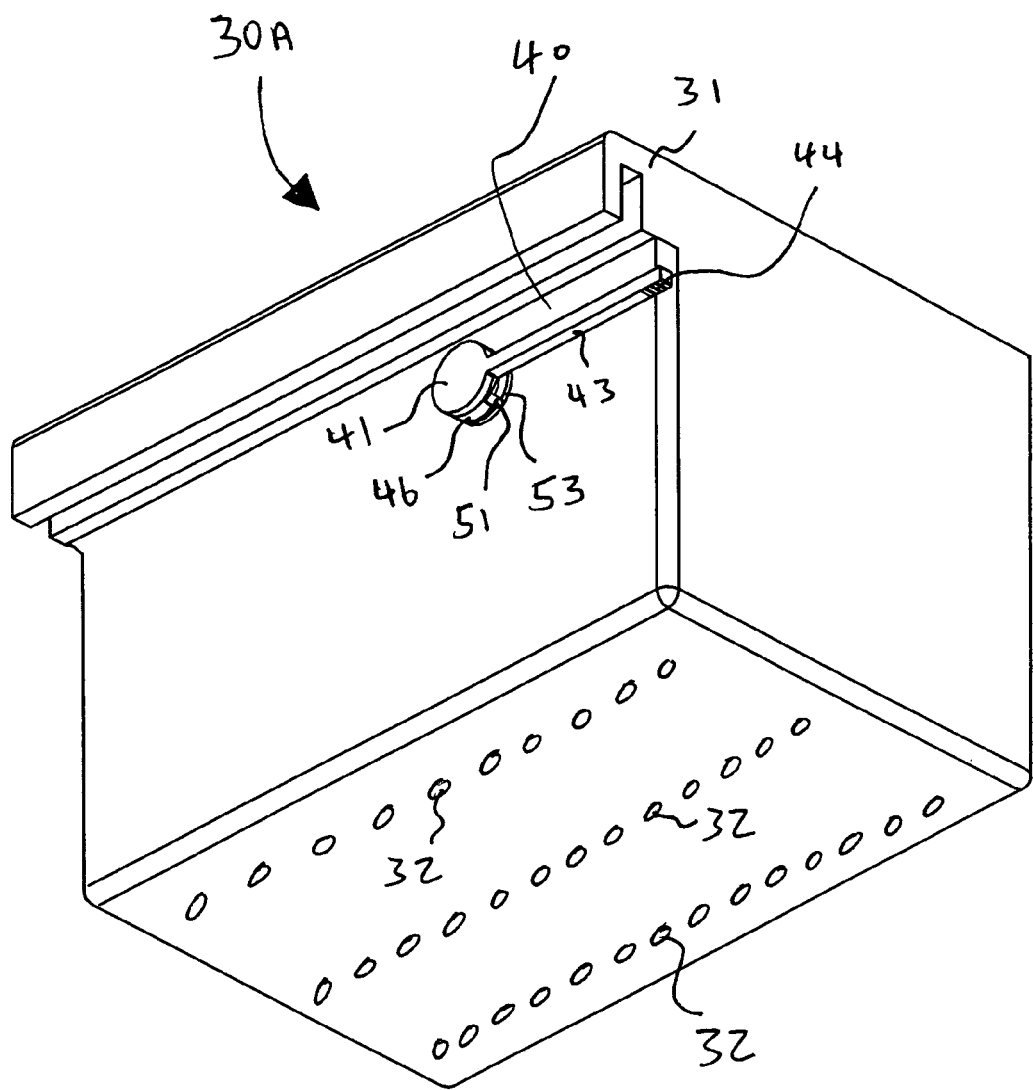
FIG. 6 is an enlarged bottom perspective view of one of the trays shown in FIG. 1, showing the apertures formed along a bottom surface thereof.
Figure 7:
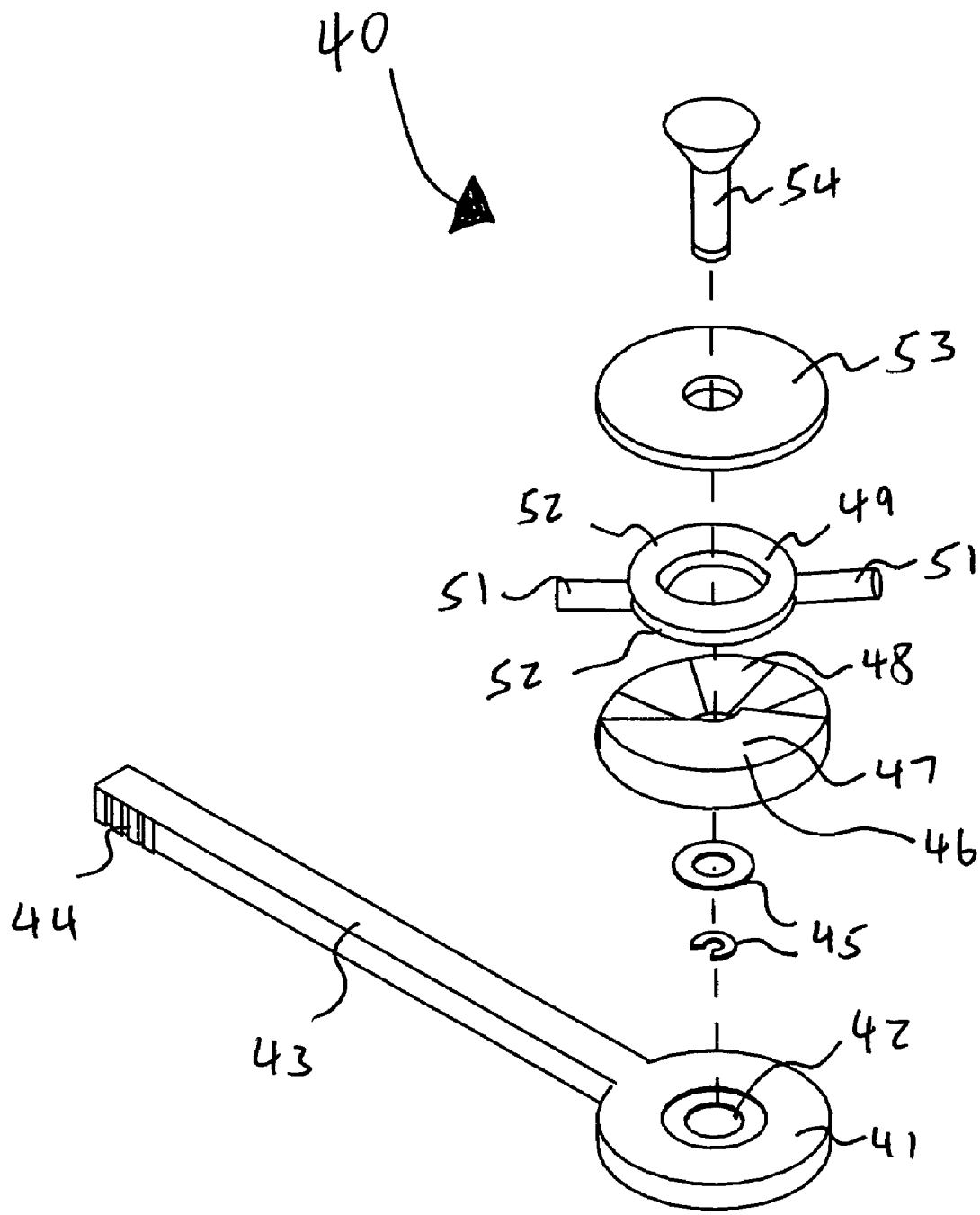
FIG. 7 is an exploded perspective view of the spring-actuated mechanism shown in FIG. 6.

Referring to FIGS. 6 and 7, the spring-actuated mechanism 40 includes an annular base member 41 that has a countersunk aperture 42 centrally formed therein. Such a base member 41 includes an elongated and rectilinear arm 43 monolithically formed therewith and radially protruding away therefrom. The arm 43 has a corrugated distal end portion 44 that is vital for conveniently and effectively providing a gripping surface on which the user may grasp the arm 43. At least one washer 45 is directly nested, without the use of intervening elements, about the countersunk aperture 42.

A beveled locking member 46 is directly seated, without the use of intervening elements, onto the base member 41 wherein the washer 45 is intercalated therebetween. Such a locking member 46 has a sloping plane gradually offset from a top surface 47 thereof wherein the sloping plane concentrically travels about the top surface 47. The locking member 46 further has a centrally registered hole 48 formed therein and vertically aligned with the aperture 42 of the base member 41, which is an important feature for allowing the fastener 54 (described herein below) to effectively and simultaneously pass through the aperture 42 and the hole 48.

A cam lever 49 has a pair of diametrically opposed flange portions 51 protruding radially outward from an outer edge 52 thereof and terminating at a predetermined distance offset from an outer perimeter of the locking member 46. A rigid seal 53 is seated directly, without the use of intervening elements, on top of the cam lever 49. A fastener 54 is vertically inserted through the aperture 42 and the hole 48 wherein the fastener 54 effectively maintains the locking member 46 and the cam lever 49 slidably engaged at the predetermined tension. The spring-actuated mechanism 40 is effectively adapted to the compressed position when a user toggles the arm 43 and rotates the locking member 46 about the fastener 54.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A foodstuff containing assembly detachably connected to an outdoor pet house, said assembly comprising:
    an elongated and rectilinear rail having a backside directly connected to a side wall of the pet house, said rail being registered along a horizontal plane and elevated from a ground surface, said rail further having a chamfered top wall provided with a linear groove extending along an entire longitudinal length of said rail, said groove being oriented parallel to a longitudinal axis of said rail wherein said groove is laterally offset away from said back side and proximate to a near side of said rail; and
    a plurality of trays slidably positional directly along said rail, said trays including monolithically formed fingers laterally extending away from a center of said trays and directly intercalated within said groove respectively, each said trays including spring-actuated means for maintaining a predetermined tension between said fingers and an inner surface of said groove such that said trays are prohibited from slidably displacing along said groove during eating conditions;
    wherein said spring-actuated means is directly connected to a back side of said trays and is intercalated between said near side of said rail and said back side of said trays, said spring-actuated means being manually adaptable along a fulcrum axis defined orthogonal to the longitudinal length of said rail between compressed and decompressed positions.

2. The assembly of claim 1, wherein said spring-actuated means comprises:
    an annular base member having a countersunk aperture centrally formed therein, said base member including an elongated and rectilinear arm monolithically formed therewith and radially protruding away therefrom, said arm having a corrugated distal end portion for providing a gripping surface on which the user may grasp said arm;
    at least one washer directly nested about said countersunk aperture;
    a beveled locking member directly seated onto said base member wherein said washer is intercalated therebetween, said locking member having a sloping plane gradually offset from a top surface thereof wherein said sloping plane concentrically travels about said top surface, said locking member further having a centrally registered hole formed therein and vertically aligned with said aperture of said base member;
    a cam lever having a pair of diametrically opposed flange portions protruding radially outward from an outer edge thereof and terminating at a predetermined distance offset from an outer perimeter of said locking member;
    a rigid seal seated directly on top of said cam lever; and
    a fastener vertically inserted through said aperture and said hole wherein said fastener maintains said locking member and said cam lever slidably engaged at the predetermined tension, said spring-actuated means being adapted to the compressed position when a user toggles said arm and rotates said locking member about said fastener.

3. The assembly of claim 1, wherein said rail comprises; male and female sections telescopically engageable along a linear path.

4. The assembly of claim 1, wherein said trays are independently and contemporaneously slidable along the longitudinal length of said rail.

5. The assembly of claim 1, wherein one said trays is provided with a plurality of apertures formed in a bottom surface thereof for channeling fluid and debris away therefrom.

6. A foodstuff containing assembly detachably connected to an outdoor pet house, said assembly comprising:
    an elongated and rectilinear rail having a backside directly connected to a side wall of the pet house, said rail being registered along a horizontal plane and elevated from a ground surface, said rail further having a chamfered top wall provided with a linear groove extending along an entire longitudinal length of said rail, said groove being oriented parallel to a longitudinal axis of said rail wherein said groove is laterally offset away from said back side and proximate to a near side of said rail; and
    a plurality of coextensively shaped trays slidably positional directly along said rail, said trays including monolithically formed fingers laterally extending away from a center of said trays and directly intercalated within said groove respectively, each said trays including spring-actuated means for maintaining a predetermined tension between said fingers and an inner surface of said groove such that said trays are prohibited from slidably displacing along said groove during eating conditions;
    wherein said spring-actuated means is directly connected to a back side of said trays and is intercalated between said near side of said rail and said back side of said trays, said spring-actuated means being manually adaptable along a fulcrum axis defined orthogonal to the longitudinal length of said rail between compressed and decompressed positions.

7. The assembly of claim 6, wherein said spring-actuated means comprises:
    an annular base member having a countersunk aperture centrally formed therein, said base member including an elongated and rectilinear arm monolithically formed therewith and radially protruding away therefrom, said arm having a corrugated distal end portion for providing a gripping surface on which the user may grasp said arm;

at least one washer directly nested about said countersunk aperture;

a beveled locking member directly seated onto said base member wherein said washer is intercalated therebetween, said locking member having a sloping plane gradually offset from a top surface thereof wherein said sloping plane concentrically travels about said top surface, said locking member further having a centrally registered hole formed therein and vertically aligned with said aperture of said base member;

a cam lever having a pair of diametrically opposed flange portions protruding radially outward from an outer edge thereof and terminating at a predetermined distance offset from an outer perimeter of said locking member;

a rigid seal seated directly on top of said cam lever; and a fastener vertically inserted through said aperture and said hole wherein said fastener maintains said locking member and said cam lever slidably engaged at the predetermined tension, said spring-actuated means being adapted to the compressed position when a user toggles said arm and rotates said locking member about said fastener.

8. The assembly of claim 6, wherein said rail comprises: male and female sections telescopically engageable along a linear path.

9. The assembly of claim 6, wherein said trays are independently and contemporaneously slidable along the longitudinal length of said rail.

10. The assembly of claim 6, wherein one said trays is provided with a plurality of apertures formed in a bottom surface thereof for channeling fluid and debris away therefrom.

11. A foodstuff containing assembly detachably connected to an outdoor pet house, said assembly comprising:

an elongated and rectilinear rail having a backside directly connected to a side wall of the pet house, said rail being registered along a horizontal plane and elevated from a ground surface, said rail further having a chamfered top wall provided with a linear groove extending along an entire longitudinal length of said rail, said groove being oriented parallel to a longitudinal axis of said rail wherein said groove is laterally offset away from said back side and proximate to a near side of said rail; and a plurality of coextensively shaped trays slidably positional directly along said rail, said trays including monolithically formed fingers laterally extending away from a center of said trays and directly intercalated within said groove respectively, each said trays including spring-actuated means for maintaining a predetermined tension between said fingers and an inner surface of said groove such that said trays are prohibited from slidably displacing along said groove during eating conditions, wherein said spring-actuated means is permanently affixed directly to said trays respectively;

wherein said spring-actuated means is directly connected to a back side of said trays and is intercalated between said near side of said rail and said back side of said trays, said spring-actuated means being manually adaptable along a fulcrum axis defined orthogonal to the longitudinal length of said rail between compressed and decompressed positions.

12. The assembly of claim 11, wherein said spring-actuated means comprises:

an annular base member having a countersunk aperture centrally formed therein, said base member including an elongated and rectilinear arm monolithically formed therewith and radially protruding away therefrom, said arm having a corrugated distal end portion for providing a gripping surface on which the user may grasp said arm;

at least one washer directly nested about said countersunk aperture;

a beveled locking member directly seated onto said base member wherein said washer is intercalated therebetween, said locking member having a sloping plane gradually offset from a top surface thereof wherein said sloping plane concentrically travels about said top surface, said locking member further having a centrally registered hole formed therein and vertically aligned with said aperture of said base member;

a cam lever having a pair of diametrically opposed flange portions protruding radially outward from an outer edge thereof and terminating at a predetermined distance offset from an outer perimeter of said locking member;

a rigid seal seated directly on top of said cam lever; and a fastener vertically inserted through said aperture and said hole wherein said fastener maintains said locking member and said cam lever slidably engaged at the predetermined tension, said spring-actuated means being adapted to the compressed position when a user toggles said arm and rotates said locking member about said fastener.

13. The assembly of claim 11, wherein said rail comprises: male and female sections telescopically engageable along a linear path.

14. The assembly of claim 11, wherein said trays are independently and contemporaneously slidable along the longitudinal length of said rail.

15. The assembly of claim 11, wherein one said trays is provided with a plurality of apertures formed in a bottom surface thereof for channeling fluid and debris away therefrom.

* * * * *